Aug. 12, 1924. 1,504,946
R. A. FERGUSON
CUTTING IMPLEMENT FOR CAKES OF ICE
Filed Feb. 28, 1922
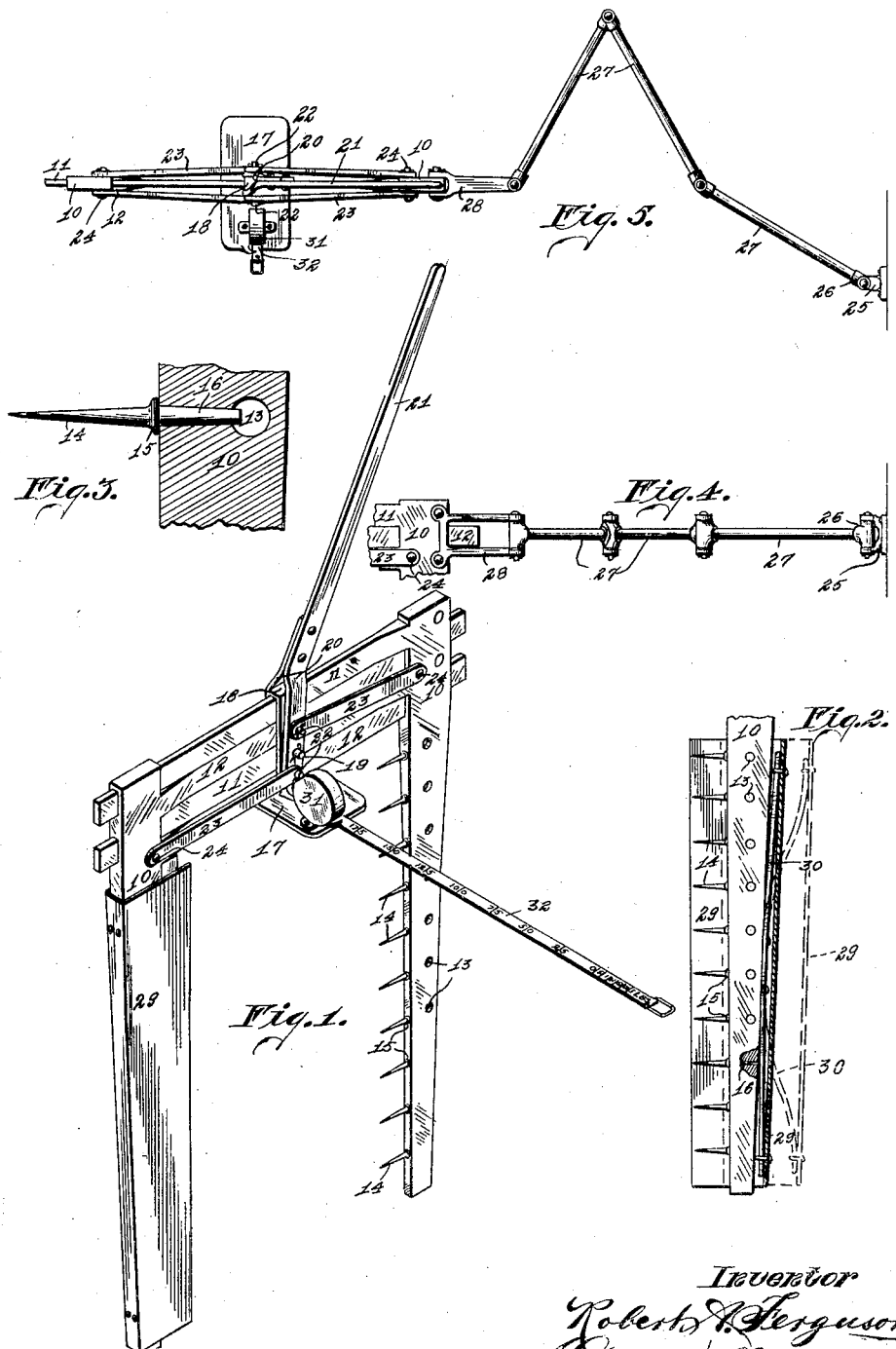

Patented Aug. 12, 1924.

1,504,946

UNITED STATES PATENT OFFICE.

ROBERT A. FERGUSON, OF OSKALOOSA, IOWA.

CUTTING IMPLEMENT FOR CAKES OF ICE.

Application filed February 28, 1922. Serial No. 539,989.

*To all whom it may concern:*

Be it known that I, ROBERT A. FERGUSON, a citizen of United States, and a resident of Oskaloosa, in the county of Mahaska and State of Iowa, have invented a certain new and useful Cutting Implement for Cakes of Ice, of which the following is a specification.

The object of my invention is to provide an ice cutting implement of simple, durable and inexpensive construction, which may be permanently attached to a wall adjacent to the place where the cakes of ice are moved to be cut, and which may be readily, quickly and easily moved into proper position with relation to a cake of ice, and then by movement of a hand operated lever and without any great application of power, the cake of ice may be severed along a straight line, accurately measured from the end of the cake and without chipping or fracturing the ice in any way except along the line on which it is proposed to cut the ice.

A further object is to provide an implement of this class in which the ice cutting points may be readily, quickly and easily removed or replaced.

A further object is to provide an implement of this class in which the sharpened ice cutting points are normally protected by shields so that they will not injure the operator or the operator's clothes, and also in this connection to provide a shield of this character which will automatically withdraw from position for protecting and covering the ice cutting points when the ice cutting points are being forced into a cake of ice.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a perspective view of an ice cutting implement embodying my invention, the protecting shield on one of the sides of the implement being removed to show the details of construction.

Figure 2 shows an enlarged detail view partly in section illustrating one of the sides of the implement and the shield for protecting the ice cutting points. In this view the dotted lines indicate the position of the shield when the ice cutting points are inserted in a cake of ice.

Figure 3 shows an enlarged, detail, sectional view illustrating one of the ice cutting points and the means for supporting it in the side of the implement showing the manner in which the points may be removed.

Figure 4 shows a side elevation of an implement embodying my invention and attached to and supported upon a wall; and Figure 5 shows a top or plan view of the same.

Referring to the accompanying drawings, I have used the reference numeral 10 to indicate one of the upright sides of the implement. At its top are two horizontally arranged guide bars 11 and in the upright 10 adjacent to the guide bars 11 are formed openings for the reception of corresponding guide bars 12 on the other upright 10. This complete element of the implement, to wit: the upright and two guide bars is preferably cast complete in a single piece.

In each of the upright side members 10 there is a series of openings equally spaced apart and extending from the inner face outwardly and tapered, as shown in Figure 3, from a maximum at the inner end to a minimum at the outer end, and at the outer end of each of said openings is a transverse opening 13 through which a punch or other implement may be inserted to force the ice cutting point inwardly to detach it from the side member 10.

In this Figure 3 the ice cutting point is shown in position and it is formed complete in one piece, and has at its inner end a long, rounded, sharpened point 14. Near its outer end there is an annular rib 15 and its end at 16 is tapered to fit the opening formed in the part 10.

In assembling the device the sharpened ice cutting points are simply placed by hand in position and then when the device is being used, the pressure of the ice upon these points will set them firmly in the tapered openings into which they are fitted.

In the event that any of the points should break or become dull, they may be quickly and easily removed as before described, and a new one substituted or the old one sharpened.

For supporting the device upon a cake of ice, I provide a broad flattened base 17 having formed on or fixed to it an upwardly extending loop 18 through which the guide bars 11 and 12 are extended. This loop is provided on each side with fulcrum pins 19 extended outwardly, and mounted upon these fulcrum pins are the levers 20 which are united above the loop 18, and one of them is provided with a handle 21.

On each of the levers 20 at points equally spaced from the pivot pins 19 are the outwardly extended journals 22, and to each of these journals is pivoted a link 23, which links are extended in opposite directions and pivoted at 24 to one of the side members 10.

By this arrangement of parts, it is obvious that when the levers 20 are at one limit of their movement, the two side members 10 will stand spaced apart to their maximum amount, then when the levers are moved toward their opposite limit of movement the two side members 10 are forced toward each other, and the sharpened ice cutting points are then forced into the sides of a cake of ice, those on one side being exactly opposite to those on the other.

For the purpose of supporting the device in position where it can be conveniently adjusted relative to a cake of ice, I have provided a socket 25 designed to be fixed to a wall, and in this socket is rotatably mounted an upright journal 26, to the upper end of which is pivoted a link 27 capable of freely swinging in a horizontal position. There is a series of these links 27 each capable of swinging in a horizontal position only, and the outer link 27 is pivoted to a bracket 28 fixed to the upper end of one of the uprights 10, as shown in Figures 4 and 5. This permits a universal movement of the ice cutting device in a horizontal plane. It may be folded up to lie flat against the wall to which the socket 25 is fixed, or it may be moved inwardly and outwardly from the wall to any desired position relative to a cake of ice.

For the purpose of affording protection against the sharp ice cutting points, I have provided on each of the uprights 10 a shield 29 which may be made of sheet metal, and which overlaps the outer edge of the upright 10 and extends inwardly over the sides thereof to a point where it will overlap and cover the ends of the ice cutting points. This shield is supported in position upon a leaf spring 30, shown in Figure 2, which spring is fixed at its central portion to the upright 10, and the spring normally holds the shield in position covering the ice cutting points 14, as shown in Figure 1. When the uprights 10 are forced toward each other against a cake of ice, the inner edges of these shields will first engage the sides of a cake of ice and the shields will then remain stationary while the ice cutting points and the upright 10 move inwardly with the points penetrating the cake of ice.

In this way, the action of these shields is entirely automatic and they do not in any way interfere with the operation of cutting ice, but when the implement is not being used as an ice cutter, the shields protect the sharp ice cutting points against injury, and at the same time they cover the ice cutting points so they will not be dangerous to the operator.

When the device is used in connection with cakes of ice that are manufactured and are of uniform dimensions I have provided a means whereby the ice may be cut into pieces of uniform size and weight as follows:

Mounted upon the support 17 is a casing 31 in which is contained a spring rolled metal measuring tape 32, marked in pounds instead of inches. After the device has been placed in position adjacent to a cake of ice of uniform predetermined dimensions, the operator may pull out the tape and hold it adjacent to one end of the cake of ice and then may move the ice cutting implement along the cake of ice until the tape shows the number of pounds of ice which it is desired to cut. When the implement is then used in cutting the ice, it will be found that the weight as indicated by the tape will correspond with the actual weight of the severed piece with great accuracy.

In practical use and when manufactured ice is being used, the cakes are slid to position resting on one edge adjacent to the ice cutting implement, then the implement is moved by hand to position with the uprights 10 on opposite sides of the cake of ice. Then assuming that it is desired to cut off a piece of ice weighing, for instance thirty pounds, the operator holds the end of the tape directly above the end of the cake of ice and then moves the implement away from the end of the cake of ice until the number of pounds desired is indicated upon the tape, whereupon, the lever 21 is moved, thus simultaneously applying pressure inwardly to all of the sharp ice cutting points.

In practice, I have found that where cakes of manufactured ice are made in sizes of approximately four hundred pounds of standard dimensions, it is necessary to force the sharpened points into the opposite sides of the cake of ice only about three quarters of an inch, and this may be done by the application of only a slight amount of pressure upon the handle 21 of the lever. I have also found that when these sharpened points are forced into the cake of ice to the amount stated, then the ice will separate along lines almost perfectly straight, and that the pieces thus separated will correspond with great accuracy in weight with the amount of weight indicated upon the tape.

During the cutting process, the protecting shields engage the side surfaces of the cake of ice, and are held stationary while the points penetrate the ice, so that no attention of the operator is required in regard to these shields.

In the event that any of the points become broken or dull they may be readily and easily removed and replaced or sharpened.

In practice I have frequently taken cakes of manufactured ice of the four hundred pound size, and with my implement have quickly and easily cut them transversely into lengths of approximately four inches, and have found upon weighing them, that the sections thus cut from the cake will vary in weight only one or two ounces, thus indicating the rather remarkable accuracy and trueness of the lines upon which the ice is severed by my improved device.

I claim as my invention:

1. In an implement of the class described, the combination of two side members, guides at the upper ends thereof, each guide being fixed to one of the members and slidably connected to the other, a series of sharpened ice cutting points on the inner edge of each of said members, means for manually forcing the said members toward each other, and a base supported at the central portion of the device at the top and designed to slidably rest upon a cake of ice to support the implement in position over a cake of ice, for the purpose as stated.

2. An implement of the class described comprising two side members, guides fixed to the upper ends of the side members, the guides on one side member being slidably mounted in the other side member, a series of sharpened ice cutting points on the inner surface of each of the side members, a base at the central portion of the implement below the said guides, a loop fixed to said base, a lever fulcrumed to the loop, links pivoted to the lever on opposite sides of its fulcrum and also pivoted to the side members, for the purpose as stated.

3. In an implement of the class described, the combination of two side members standing spaced apart from each other, sharpened projections on each member pointing toward each other, each side member being provided at its upper end with two spaced guide bars extending at right angles to the side member, and each side member also being provided with two openings to receive the spaced guide bars of the other side member, and means for moving the side members toward and from each other.

4. In an implement of the class described, the combination of two side members standing spaced apart from each other, sharpened projections on each member pointing toward each other, each side member being provided at its upper end with two spaced guide bars extending at right angles to the side member, and each side member also being provided with two openings to receive the spaced guide bars of the other side member, and means for moving the side members toward and from each other, said means comprising a lever fulcrumed between the side bars, and links connected to the lever on opposite sides of its fulcrum and extended in opposite directions therefrom and connected to the side members.

Des Moines, Iowa, February 21, 1922.

ROBERT A. FERGUSON.